(12) United States Patent
Richards et al.

(10) Patent No.: US 8,437,156 B2
(45) Date of Patent: May 7, 2013

(54) MIRROR-IMAGE VOLTAGE SUPPLY

(75) Inventors: Steven Richards, Georgetown, MA (US); Geoffrey Ryding, Manchester, MA (US); Theodore Smick, Essex, MA (US)

(73) Assignee: GTAT Corporation, Nashua, NH (US)

( * ) Notice: Subject to any disclaimer, the term of this patent is extended or adjusted under 35 U.S.C. 154(b) by 835 days.

(21) Appl. No.: 12/537,022

(22) Filed: Aug. 6, 2009

(65) Prior Publication Data

US 2011/0032736 A1 Feb. 10, 2011

(51) Int. Cl.
*H02M 3/18* (2006.01)
*H02M 7/00* (2006.01)

(52) U.S. Cl.
USPC .............................. 363/61; 307/110

(58) Field of Classification Search .................... 363/59, 363/60, 61; 307/110
See application file for complete search history.

(56) References Cited

U.S. PATENT DOCUMENTS

| | | | |
|---|---|---|---|
| 4,995,069 A | | 2/1991 | Tanaka |
| 6,154,382 A | * | 11/2000 | Kawahara et al. ............. 363/68 |
| 7,050,539 B2 | * | 5/2006 | Loef et al. ..................... 378/105 |
| 7,577,235 B2 | * | 8/2009 | Jedlitschka ................... 378/111 |
| 2009/0050347 A1 | * | 2/2009 | Tekletsadik et al. ..... 174/120 SR |

FOREIGN PATENT DOCUMENTS

| | | |
|---|---|---|
| EP | 0991174 A2 | 4/2000 |
| EP | 1931020 A1 | 6/2008 |

OTHER PUBLICATIONS

Litton, Carl. "On the Trail of a MegaVolt," Raleigh-Bartlett Science Club, Nov. 10, 2004, <http://www.pupman.com/hvlistarchives/2004/Nov/msg00050.html>.
Calvert, J.B., "Power Supplies and Voltage Regulators" Jul. 8, 2002, <http://mysite.du.edu/~etuttle/elect9.htm>.
Iqbal et al., *A Bipolar Cockcroft-Walton Voltage Multiplier for Gas Lasers*, American Journal of Applied Sciences, 4 (10): 795-801, 2007 <scipub.org/fulltext/ajas/ajas410795-801.pdf>.
Untitled drawing <http://www.altair.org/projects/MOTstack.gif>.
"Notification of Transmittal of the International Search Report and the Written Opinion of the International Searching Authority, or the Declaration," International Filing Date: Jul. 29, 2010, International Application No. PCT/US2010/043793, Applicant: Twin Creeks Technologies, Inc., Date of Mailing: Nov. 26, 2010, pp. 1-10.

* cited by examiner

*Primary Examiner* — Harry Behm
*Assistant Examiner* — Matthew Grubb
(74) *Attorney, Agent, or Firm* — The Mueller Law Office, P.C.

(57) ABSTRACT

A voltage supply incorporates two voltage supplies connected in a mirror-image series arrangement to generate a DC voltage between the respective common terminals of the voltage supplies.

8 Claims, 7 Drawing Sheets

MIRROR-IMAGE VOLTAGE SUPPLY

BACKGROUND OF THE INVENTION

1. Field of the Invention

The invention relates to voltage supplies, particularly supplies of high voltage.

2. Background Information

High voltages, in excess of 100 kV, are sometimes used in manufacturing. A manufacturing structure may include dedicated power supplies for maintaining component modules at a high relative AC or DC potential.

One conventional approach to generating high DC voltages uses a Cockcroft-Walton ("CW") voltage multiplier. A CW voltage multiplier is an arrangement of diodes and capacitors that rectifies an AC input voltage by charging the capacitors in parallel and discharging them in series. The diodes and capacitors are arranged in stages, each of which augments the DC output voltage by one increment equal to the peak AC input voltage value. Although in principle any arbitrarily high voltage requirement can be satisfied with a CW multiplier having a sufficient number of stages, in practice as the number of stages increases, the multiplier suffers from reduced power efficiency and has limited usefulness for high-power applications.

There is accordingly a need for a voltage supply capable of generating voltages on the order of several hundred kilovolts while delivering currents on the order of tens of milliamps.

SUMMARY OF THE INVENTION

An electrical system comprises a first voltage supply and a second voltage supply connected in series in a mirror-image configuration. Each of the voltage supplies has a respective common terminal and output terminal. The first voltage supply is configured with its output terminal at a higher electrical potential than its common terminal. The second voltage multiplier is configured with its output terminal at a lower electrical potential than its common terminal. The electrical system is configured to supply a voltage between the respective common terminals of the first and second voltage supplies.

BRIEF DESCRIPTION OF THE DRAWINGS

The invention description below refers to the accompanying drawings, wherein identical reference symbols designate like functional elements, and in which.

Features in the figures are not, in general, drawn to scale.

DETAILED DESCRIPTION OF AN ILLUSTRATIVE EMBODIMENT

Figure 1:
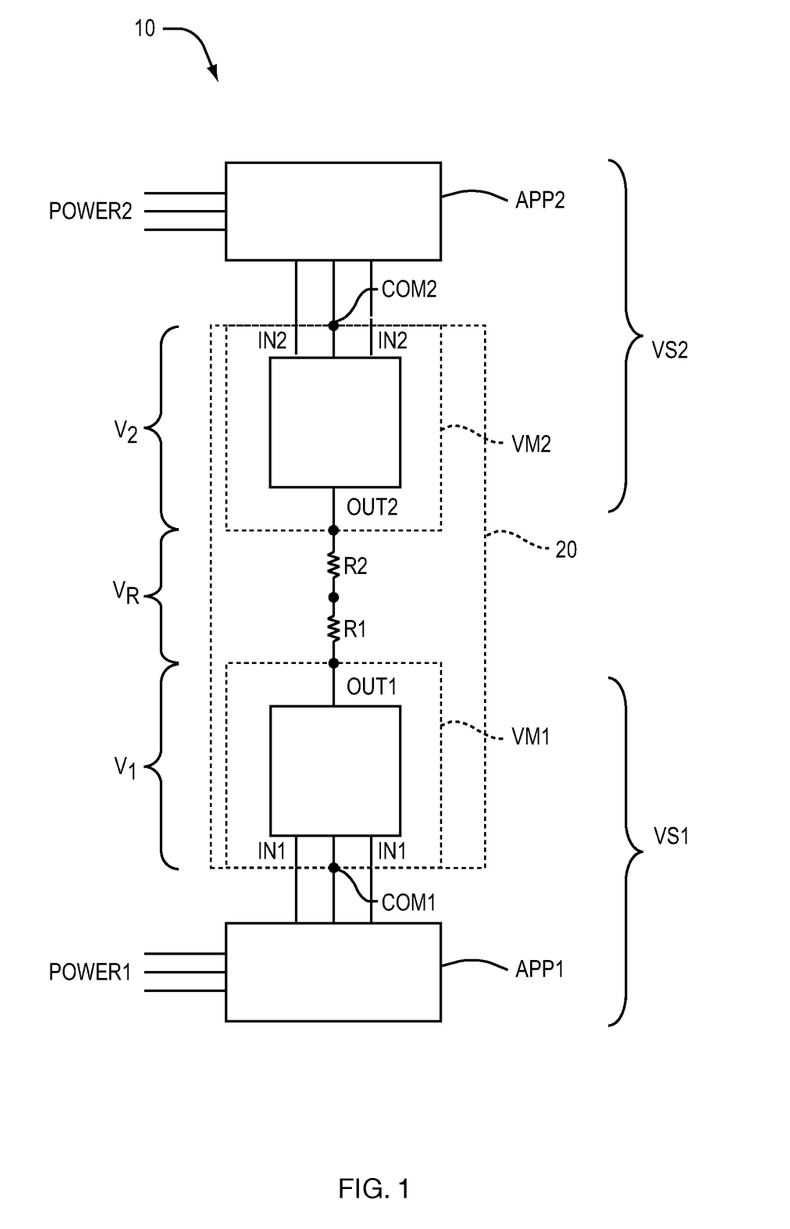
FIG. 1 schematically depicts a mirror-image voltage supply constructed in accordance with the invention.

With reference to FIG. 1, an illustrative mirror-image voltage supply 10 comprises a first voltage supply VS1 and a second voltage supply VS2 connected in a mirror-image configuration. The first voltage supply VS1 is configured to present a first potential difference, i.e., a first voltage $V_1$ across an output terminal OUT1 and a common terminal COM1, the electrical potential being higher at OUT1 than at COM1. The second voltage supply VS2 is configured to present a second potential difference, i.e., a second voltage $V_2$ across an output terminal OUT2 and a common terminal COM2. The second voltage supply VS2 may be termed a negative voltage supply in that its output terminal OUT2 is at a lower electrical potential than its common terminal COM2. The first and second voltage supplies VS1 and VS2 are connected together through their respective output terminals OUT1 and OUT2. The mirror-image voltage supply 10 supplies a voltage across the common terminals COM1 and COM2 of the first and second voltage supplies VS1 and VS2, respectively.

As used herein in "mirror-image voltage supply," "mirror-image" specifies that the constituent first and second voltage supplies VS1 and VS2 are connected in series at their respective output terminals OUT1 and OUT2 and does not necessitate that both of the voltage supplies VS1 and VS2 be identical to one another with respect to any particular capacity or feature.

Illustratively, the first voltage supply VS1 may be constituted of a voltage apparatus APP1 and a voltage multiplier VM1 and the second voltage supply VS2 may be constituted of a voltage apparatus APP2 and a voltage multiplier VM2.

The voltage apparatus APP1 and APP2 of the first and second voltage supplies VS1 and VS2, respectively, have respective power inputs POWER1 and POWER2 for receiving power from, e.g., a wall outlet (not shown). The voltage apparatus APP1 is configured to provide a first AC input voltage to the voltage multiplier VM1 of the first voltage supply VS1. The voltage apparatus APP2 is configured to provide a second AC input voltage to the voltage multiplier VM2 of the second voltage supply VS2.

The voltage multiplier VM1 has input terminals IN1 that constitute an AC input for the voltage multiplier VM1 of the first voltage supply VS1. The voltage multiplier VM1 of the first voltage supply VS1 is configured to deliver a multiple of the first AC input voltage at its single output terminal OUT1, at a higher electrical potential than its common terminal COM1. The voltage multiplier VM2 has input terminals IN2 that constitute an AC input for the voltage multiplier VM2 of the second voltage supply VS2. The voltage multiplier VM2 of the second, negative voltage supply VS2 is configured to deliver a multiple of the second AC input voltage at its single output terminal OUT2, at a lower electrical potential than its common terminal COM2.

The voltage multipliers VM1 and VM2 connected in series at the output terminals OUT1 and OUT2 constitute a mirror-image voltage multiplier pair 20. As used herein in "mirror-image voltage multiplier pair," "mirror-image" specifies that the constituent voltage multipliers VM1 and VM2 are connected in series at their respective output terminals OUT1 and OUT2 and does not necessitate that both of the voltage multipliers VM1 and VM2 be identical to one another with respect to any particular capacity or feature. In the embodiment the outputs OUT1 and OUT2 of the first and second voltage multipliers VM1 and VM2, respectively, are electrically connected through first and second resistors R1 and R2.

In alternative embodiments, the outputs OUT1 and OUT2 may be joined directly without any intervening element.

During operation of the illustrative mirror-image voltage supply 10, the voltage apparatus APP1 and APP2 drive the respective voltage multipliers VM1 and VM2 to generate a first voltage $V_1$ and a second voltage $V_2$, respectively, contributing to the voltage supplied by the mirror-image voltage supply 10 across the common terminals COM1 and COM2.

The respective capacities of the voltage multiplier VM1 or VM2 and of the respective voltage apparatus APP1 or APP2 supplying it together govern the voltage and power deliverable across the common terminals COM1 and COM2 of the illustrative mirror-image series voltage supply 10. The voltage apparatus APP1 and APP2 function to provide an AC input voltage of amplitude, frequency, and number of phases usable by the respective voltage multipliers VM1 and VM2. The AC input voltages supplied by the respective voltage apparatus APP1 and APP2 in the mirror-image voltage supply 10 need not be the same in amplitude, frequency or number of phases. Either of the voltage apparatus APP1 and APP2 may be, e.g., an inverter, a transformer or may include both.

It will be appreciated that although the inputs POWER1 and POWER2 to the respective voltage apparatus APP1 and APP2 are represented in the drawings as three leads, consistent with multiphase capability, fewer or more than three leads may constitute either or both of the inputs POWER1 and POWER2. Either or both of the voltage apparatus APP1 and APP2 may have respective leads configured for power having a single phase, two, three or more phases and/or neutral or ground leads.

Similarly, the voltage multipliers VM1 and VM2 in the mirror-image voltage multiplier pair 20 may differ from one another in their respective phase or multiplication capacities. Each of the voltage multipliers VM1 and VM2 illustrated in FIG. 1 is configured to receive a two-phase AC input voltage at the respective pairs of input terminals IN1 and IN2. In alternative embodiments, either of the voltage multipliers VM1 and VM2 may be configured as a half-wave (single-phase) multiplier, with a single input terminal constituting the AC input. Or, either of the voltage multipliers VM1 and VM2 may be configured for multiplying an AC input voltage of three or more phases. The details of managing single-phase or multi-phase voltages into and out of voltage devices are known to those skilled in the art.

The voltage multipliers VM1 and VM2 in the mirror-image voltage multiplier pair 20 may illustratively be Cockcroft-Walton multipliers. Compared to a single Cockcroft-Walton multiplier of n stages, the use of a pair of Cockcroft-Walton voltage multipliers with a total of n stages, configured as the voltage multipliers VM1 and VM2 of the respective first and second voltage supplies VS1 and VS2 in the mirror-image voltage supply 10, may present the same voltage with greater power capacity and superior voltage regulation. The structure and function of Cockcroft-Walton multiplication circuits is known to those skilled in the art.

Figure 2:
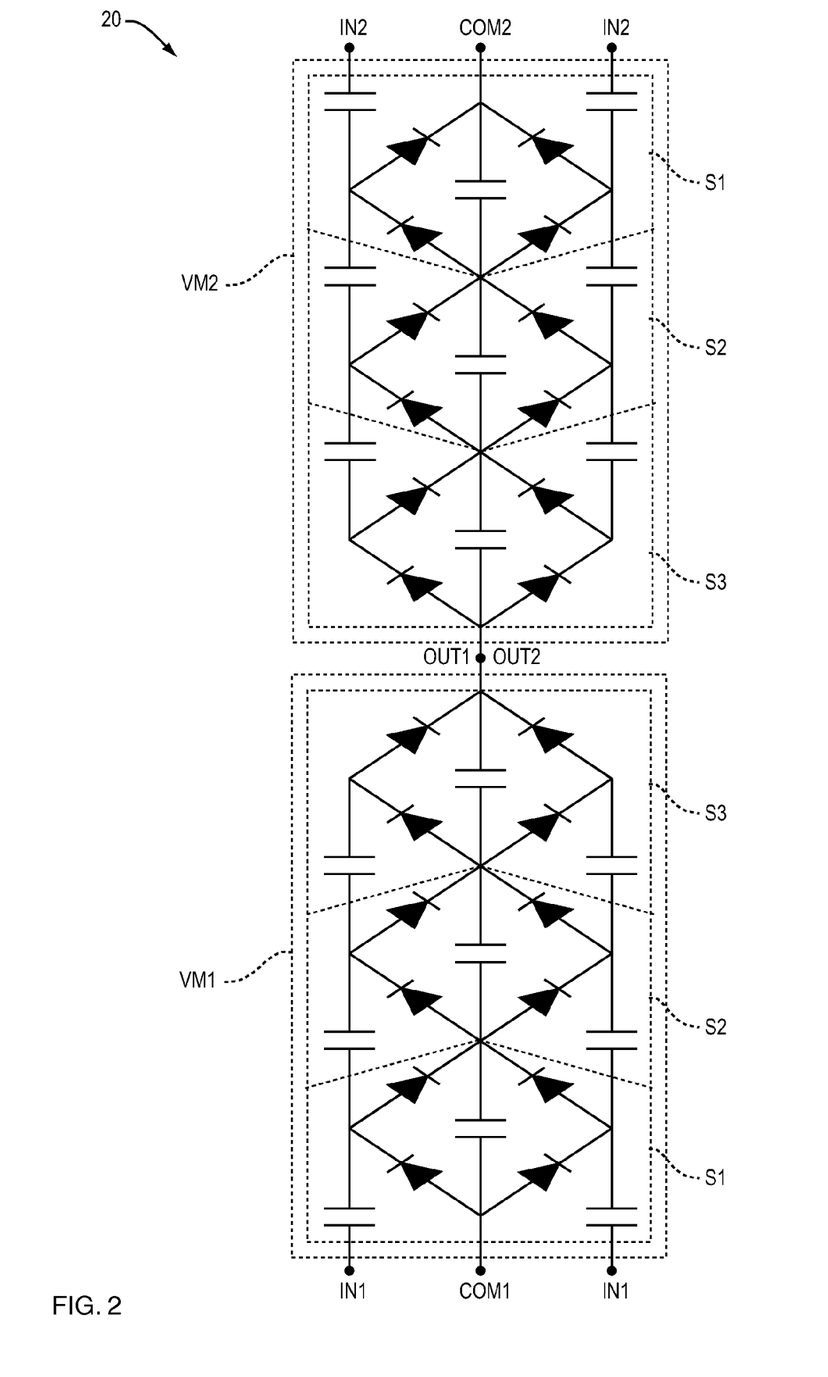
FIG. 2 schematically depicts a mirror-image voltage multiplier pair, having two Cockcroft-Walton voltage multipliers, constructed in accordance with the invention.

With reference to FIG. 2, the voltage multiplier VM1 of the first voltage supply VS1 may illustratively be a two-phase Cockcroft-Walton voltage multiplier. The Cockcroft-Walton multiplier shown in the drawing comprises first, second, and third stages S1, S2 and S3. The structure and operation of the voltage multiplier VM2 of the second voltage supply VS2 is analogous to that of the voltage multiplier VM1 but differ in that the respective stages S1, S2 and S3 of the second voltage multiplier VM2 develop an electrical potential at the output terminal OUT2 which is lower than that at the common terminal COM2. In the embodiment, the contributions $V_1$ and $V_2$ (FIG. 1) by the respective illustrative Cockcroft-Walton voltage multipliers VM1 and VM2 to the voltage supplied between the respective common terminals COM1 and COM2 are each nominally equal to three times the peak-to-peak value of the respective first and second AC input voltages supplied to the input terminals IN1 and IN2. The pictured embodiment of the mirror-image voltage multiplier pair 20 may deliver better efficiency in the mirror-image voltage supply 10 than a single six-stage Cockcroft-Walton voltage multiplier.

Figure 3:
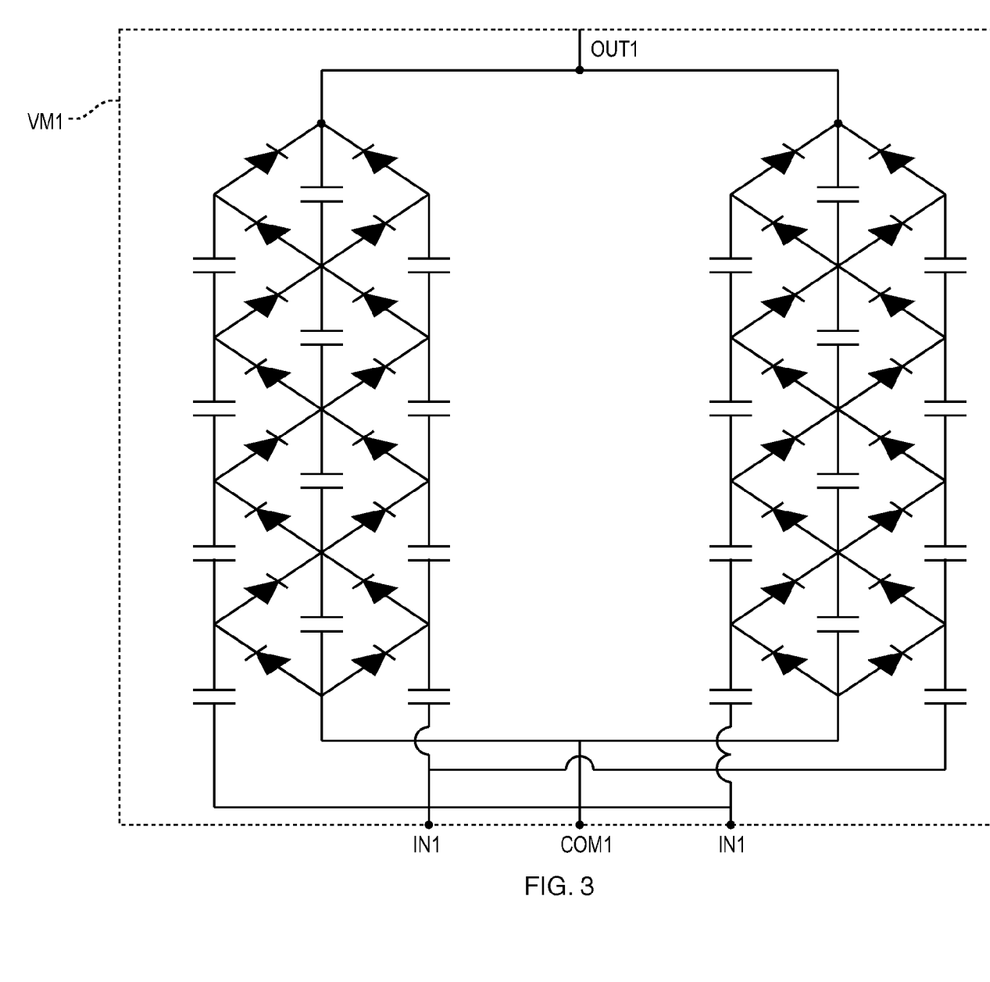
FIG. 3 schematically depicts a voltage multiplier having parallel Cockcroft-Walton multiplication structures.

In an alternative embodiment, either of the voltage multipliers VM1 and VM2 may include parallel Cockcroft-Walton structures. With reference to FIG. 3, the voltage multiplier VM1 may comprise two four-stage Cockcroft-Walton multipliers. The parallel configuration affords doubled power output compared to a single four-stage Cockcroft-Walton multiplier.

Figure 4:
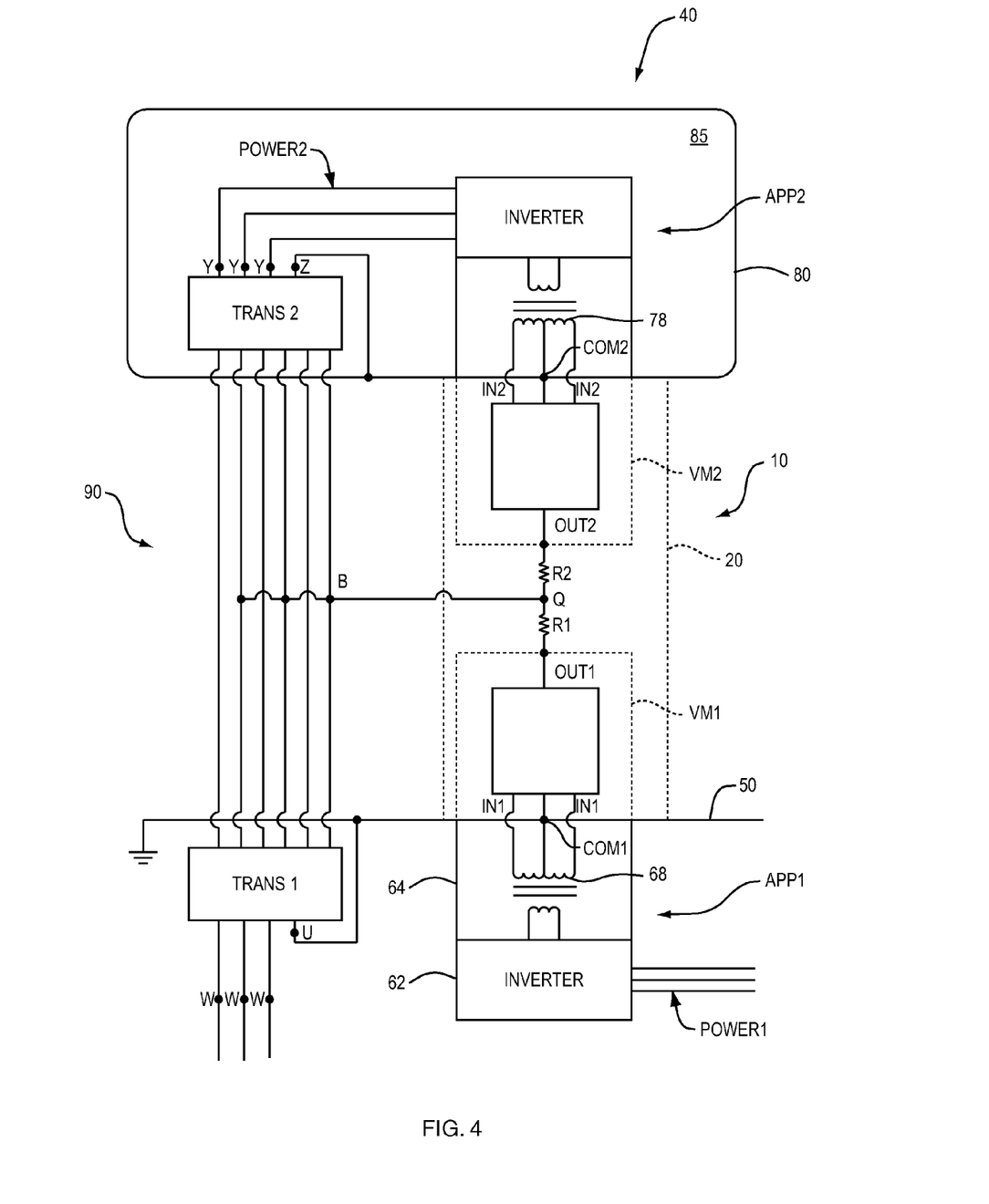
FIG. 4 schematically depicts a high-voltage structure incorporating the mirror-image voltage supply of the invention FIG. 5 schematically depicts a series-transformer isolation circuit.

The mirror-image voltage supply 10 is adaptable to define lower- and higher-voltage regions in electrical equipment. The mirror-image series voltage supply 10 may be particularly useful in equipment that maintains a region at high voltages, on the order of greater than 100 kV, such as e.g., medical devices or materials processing machinery. With reference to FIGS. 1 and 4, in an illustrative high-voltage structure 40, the voltage apparatus APP1 of the first voltage supply VS1 is illustratively located under a ground shield 50 and the voltage apparatus APP2 of the second voltage supply VS2 is located in a high-voltage enclosure 80. The mirror-image voltage multiplier pair 20 may be disposed between the shield 50 and the enclosure 80.

The voltage multipliers VM1 and VM2 illustratively have the capacity to multiply the respective AC input voltages supplied to their input terminals IN1 and IN2 by a factor of five or more while delivering a DC output current of 20 mA, 50 mA, 75 mA, 100 mA, 200 mA, or greater. Such voltage multipliers based on Cockcroft-Walton circuits are available from HiTek Power of Littlehampton, UK.

The voltage apparatus APP1 illustratively comprises an inverter 62 and a transformer 64. The power input POWER1 is configured to provide 3-phase, 60-Hz power to the inverter. The inverter is configured to convert the 3-phase 60-Hz power to a higher frequency, single-phase voltage which is processed by the transformer to produce the first AC input voltage across a secondary winding 68. The center of the secondary winding 68 is tapped by the common terminal COM1, which is illustratively electrically connected to the ground shield 50. The voltage apparatus APP1 is illustratively configured to provide to the voltage multiplier VM1 a first AC input voltage oscillating at on the order of 10 kHz or greater and having amplitude on the order of, e.g., 5 kV, 10 kV, 20 kV, 30 kV or greater. Accordingly, the voltage multiplier VM1 may generate a voltage contribution $V_1$ of 50 kV, 100 kV, 150 kV, 200 kV, 250 kV, 300 kV, or greater.

The voltage apparatus APP2 is disposed in the enclosure 80, which delimits a high-voltage region 85 of the electrical structure 40. In the embodiment, the voltage apparatus APP1 and APP2 are illustratively identical. The center of a secondary winding 78 in the voltage apparatus APP2 is tapped by the common terminal COM2, which is electrically connected to the high-voltage enclosure 80. The voltage apparatus APP2 is configured to supply the second AC input voltage to the input terminals IN2 of the voltage multiplier VM2. The power input POWER2 of the voltage apparatus APP2 may be configured to receive power through any means known to those skilled in the art for providing power at a high voltage, such as, for example, a single transformer, a motor-generator set or a diesel generator.

In the illustrative embodiment, a three-phase series-transformer isolation circuit 90 is adapted to transmit three-phase power from the potential of the ground shield 50 to the voltage of the enclosure 80 and energize the power input POWER2 of the voltage apparatus APP2. Alternatively, the series-transformer isolation circuit 90 may be configured to transmit power of one, two, four, or a greater number of phases and need not match any aspect of the voltage supply 10 with respect to number of phases. The series-transformer isolation circuit 90 comprises a first transformer block TRANS1, disposed under the ground shield 50 and a second transformer block TRANS2, disposed in the high-voltage enclosure 80.

Figure 5:
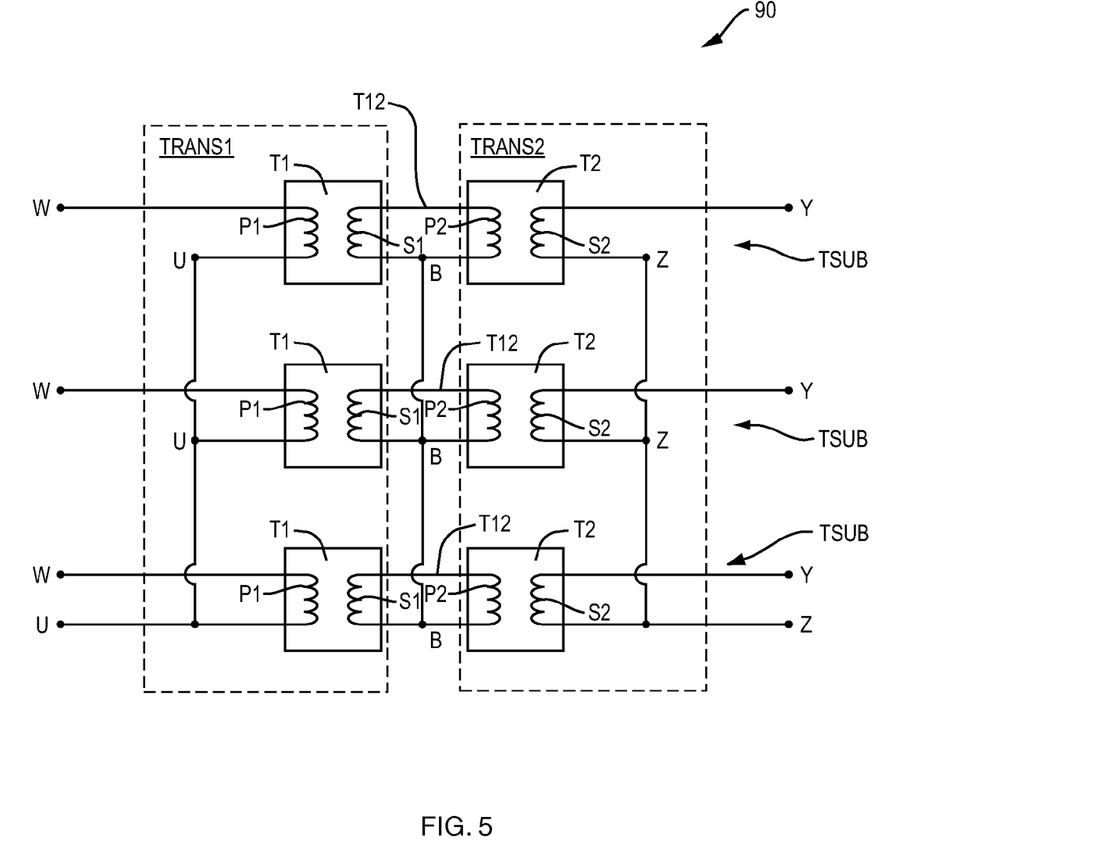

With reference to FIG. 5, the series-transformer isolation circuit 90 comprises a single-phase subsystem TSUB for each phase to be transmitted to the high-voltage enclosure 80. The subsystems TSUB comprise respective first transformers T1, each having a primary winding P1 and a secondary winding S1, and second transformers T2, each having a primary winding P2 a secondary winding S2. The primary winding P1 of the first transformer T1 has input leads W and U for receiving power, e.g., from the wall. In each subsystem TSUB, the secondary winding S1 of the first transformer T1 is electrically connected to the primary winding P2 of the second transformer T2 to form an inter-transformer coupling T12. Subsystem tap points B on the respective inter-transformer couplings T12 are electrically connected. The secondary winding S2 of the second transformer T2 has output leads Y and Z for delivering power to a load at a voltage above or below the input leads W and U.

The numbers of turns in the windings P1, S1, P2, and S2 may be such that the original voltage provided across the primary winding P1 of the first transformer T1 is of the same amplitude as that delivered across the second winding S2 of the second transformer T2 for each subsystem TSUB. Illustratively, the first and second transformers T1 and T2 have the same withstanding voltage.

The primary and secondary windings P1 and S1 of the first transformers T1 in the three subsystems TSUB together constitute the first transformer block TRANS1. The primary and secondary windings P2 and S2 of the second transformers T2 in the three subsystems TSUB together constitute the second transformer block TRANS2. The structure and function of the series-transformer isolation circuit 90 is described in co-owned U.S. application Ser. No. 12/411,048, Richards et al., entitled "Isolation Circuit for Transmitting AC Power to a High-Voltage Region," the disclosure of which is incorporated herein by reference in its entirety.

Referring again to FIG. 4, the input leads W of the first transformer block TRANS1 are configured to receive power for the second voltage apparatus APP2. The input lead U is electrically tied to the ground shield 50. It will be appreciated that the input lead U may be equivalently tied instead to, e.g., a neutral line provided with the power received by the input leads W. The output lead Z of the second transformer block TRANS2 is electrically connected to the high-voltage enclosure 80. The output leads Y of the second transformer block TRANS2 are connected to the power input POWER2 of the voltage apparatus APP2. The subsystem tap points B of the series-transformer isolation circuit 90 may be electrically connected to the mirror-image voltage multiplier pair 20 between the outputs OUT1 and OUT2 to maintain a manageable voltage distribution across the first and second transformer blocks TRANS1 and TRANS2.

Illustratively the voltage multipliers VM1 and VM2 have the same I-V and, aside from the direction, multiplication characteristics. In this case, when powered respectively by the identical voltage apparatus APP1 and APP2, the voltage multipliers VM1 and VM2 generate equal respective contributions $V_1$ and $V_2$ (FIG. 1). The voltage yield of the mirror-image series voltage supply 10 may be twice that available from either of the voltage multipliers VM1 and VM2 alone, about 100 kV, 150 kV, 200 kV, 300 kV, or greater. If the voltage multipliers VM1 and VM2 are Cockcroft-Walton voltage multipliers, the mirror-image series voltage supply 10 may have a greater power capacity and better output stability than a single voltage Cockcroft-Walton multiplier having twice the number of stages of one of the voltage multiplier VM1 and VM2.

Referring to FIG. 4, a voltage midpoint Q of the mirror-image voltage multiplier pair 20, halfway between the common terminals COM1 and COM2, may be electrically connected to the subsystem tap points B of the series-transformer isolation circuit 90. Illustratively, the first and second resistors R1 and R2 have total resistance of 1 kΩ, 2 kΩ, 3 kΩ, 5 kΩ, 10 kΩ, 20 kΩ, or more. The first and second resistors R1 and R2 may limit the magnitude of a current spike in the event of arcing between the enclosure 80 and the ground shield 50.

Figure 6:
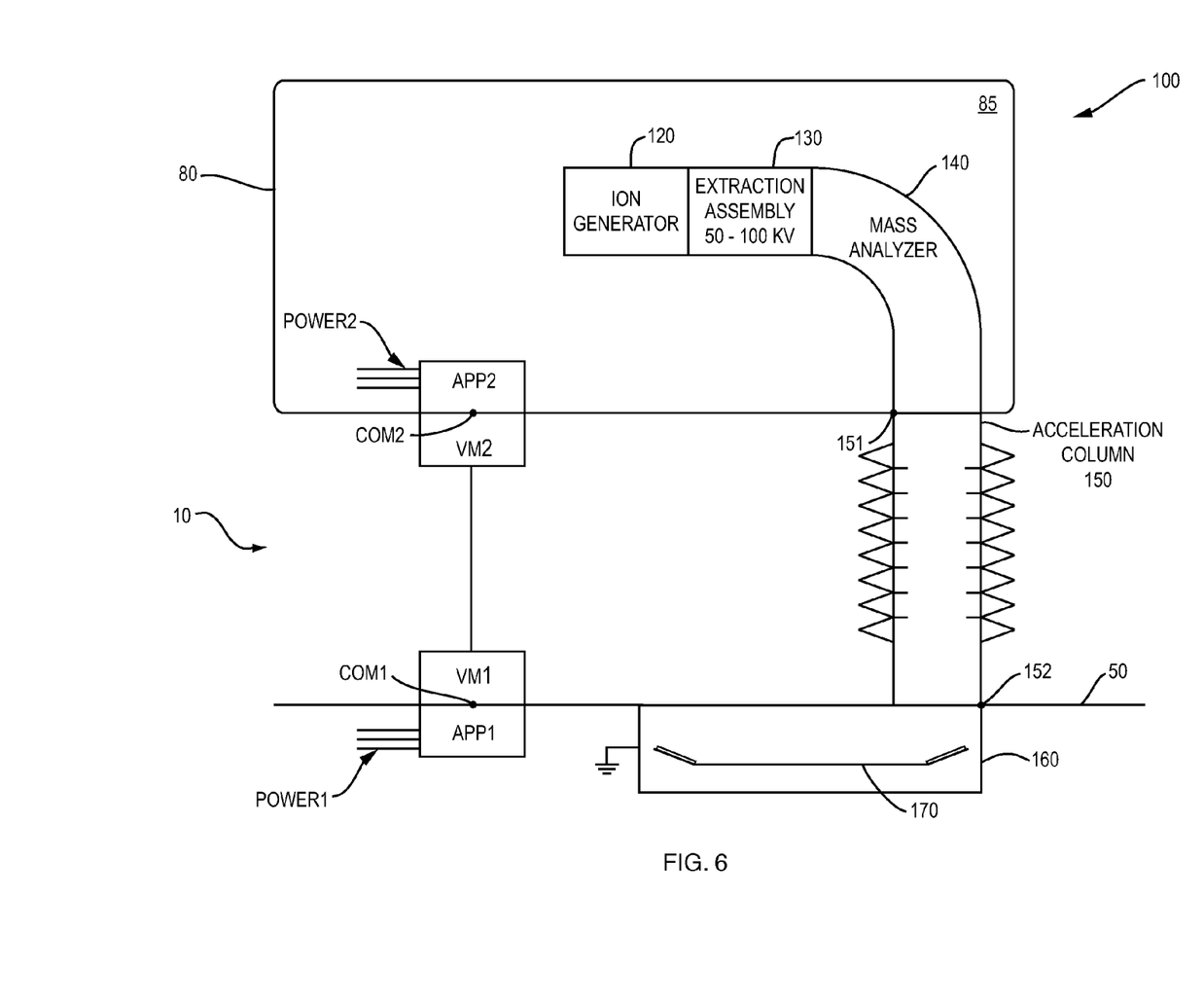
FIG. 6 schematically depicts an ion implanter incorporating the mirror-image voltage supply constructed in accordance with the invention.

The high-voltage structure 40 incorporating the mirror-image series voltage supply 10 (FIG. 1) may be, e.g., a high-energy ion implanter. With reference to FIG. 6, a positive-ion implanter 100 illustratively comprises an ion generator 120 supplied by a gas source (not shown), an ion-extraction assembly 130, a mass analyzer 140, an acceleration column 150, and an endstation 160 that houses a substrate appliance 170. A vacuum apparatus (not shown) is operable to maintain an ion pathway from the ion generator 120, through the extraction assembly 130, mass analyzer 140, acceleration column 150, and endstation 160 at low pressure during an implantation procedure. A high-voltage region 85 disposed within the high-voltage enclosure 80 may house elements of the ion implanter 100 operating at high voltage, such as the ion generator 120, extraction assembly 130, mass analyzer 140, a first end 151, distal with respect to the endstation 160, of the acceleration column 150, and ancillary devices such as pumps and power supplies (not shown). The function of such power-consuming devices in ion implanters is known to those skilled in the art.

The ground shield 50 may electrically anchor elements of the ion implanter 100 operating at ground potential such as a second end 152, proximal with respect to the endstation 160, of the acceleration column 150, and the endstation 160.

The extraction assembly 130 comprises an extraction voltage source, disposed to electrostatically impel ions from the generator 120 and steer them toward the mass analyzer 140. The mass analyzer 140 is configured to sort extracted ions according to their respective mass/charge ratios, thereby selecting ions of interest for implantation.

The acceleration column 150 is configured to move ions down an accelerating voltage between the first end 151 and the second end 152, thereby bringing selected ions to a desired ultimate ion energy, or implant energy, before they reach the endstation 160. The first end 151 of the acceleration column 150 is, illustratively, electrically connected to the high-voltage enclosure 80.

In the endstation 160, the appliance 170, which may be bowl-shaped, is configured to bear substrates such as semiconductor wafers. The endstation 160 is operable to rotate the appliance 170 about an axis, thereby bringing the substrates successively before the path of impinging ions.

The function and cooperation of the ion generator 120, extraction assembly 130, mass analyzer 140, acceleration column 150, and endstation 160 to carry out ion implantation are described in co-owned U.S. application Ser. No. 12/122,108, Parrill et al., entitled "Ion Implanter for Photovoltaic Cell Fabrication," and Ser. No. 12/494,270, Ryding et al., entitled "Ion Implantation Apparatus and Method," the disclosures of both of which are incorporated herein by reference in their entirety.

In an illustrative embodiment of the high-energy implanter 100, the mirror-image-series voltage supply 10 is situated in the ion implanter 100 to maintain the high-voltage enclosure 80 at a generated DC potential higher than the potential of the endstation 160 by $V_1+V_2$ (FIG. 1).

The voltage apparatus APP2 is energized at the power input POWER1. The series-transformer isolation circuit 90 (FIG. 4), or some other structure known to those skilled in the art, may be configured to energize the power input POWER2 of the second voltage apparatus APP2.

In an exemplary procedure using the implanter 100 to implant positive high-energy ions in semiconductor wafers, the appliance 170 is loaded with wafers. The ion pathway of the ion implanter 100 is brought to low pressure, e.g., on the order of $10^{-4}$ millibar or lower. The endstation 160 is operated to rotate the appliance 170. The mirror-image high-voltage supply 10 is operated to maintain the high-voltage enclosure 80 at the generated DC high voltage with respect to the appliance 170. The total generated DC high voltage may be, e.g., greater than about 100 kV, 200 kV, 300 kV, 400 kV, 500 kV, or 600 kV.

The ion generator 120 is activated to generate ions, which are extracted by the extraction assembly 130. The ions impelled into the mass analyzer 140 have respective energies corresponding to the extraction voltage which may be on the order of, e.g., 10 to 90 kV. Passing through the magnetic field of the mass analyzer 140, the ions are deflected according to their respective magnetic rigidities and splayed into distinct components. A component of interest, selected and transmitted from the mass analyzer 140, travels in a beam constituting a current of the ion of interest. The beam enters the acceleration column 150 at the first end 151. The generated DC high voltage supplied by the mirror-image series voltage supply 10 between the first and second ends 151 and 152 of the acceleration column serves as an acceleration voltage for ions in the beam.

Acceleration through the column 150 augments the energy of the ions in the beam to an ultimate ion energy, or implant energy, corresponding to the sum of the extraction voltage and the acceleration voltage. Ions in the beam irradiate the wafers disposed on the appliance 170 until the time integral of the current of the ion beam corresponds to a desired dose.

In one embodiment, the high-energy ion implanter 100 is adapted to implant hydrogen or helium ions preparatory to separating semiconductor laminae for photovoltaic applications. Techniques for making semiconductor laminae by cleaving after high-dose implantation of hydrogen or helium are described in, for example, co-owned U.S. application Ser. No. 12/026,530, Sivaram et al., entitled "Method to Form a Photovoltaic Cell Comprising a Thin Lamina"; and U.S. application Ser. No. 12/407,064, Petti et al., entitled "Method to Make Electrical Contact to a Bonded Face of a Photovoltaic Cell", the disclosures of which are both incorporated herein by reference in their entirety. Hydrogen, helium, or both are implanted in a wafer of semiconductor material, such as monocrystalline silicon, at a depth defining a cleave plane, which determines ultimate lamina thickness. Removal of the lamina from the implanted wafer is effected by, for example, annealing the wafer to provoke exfoliation of the lamina at the cleave plane. For preparation of efficient photovoltaic devices, lamina thicknesses of about 1 micron and greater are desirable. Devices may benefit from lamina thicknesses of, for example, 2 µm, 3 µm, or 4 µm and greater. The location of the cleave plane is related to the depth at which implanted ions come to rest in the wafer, which is largely dependent on the implant energy. Accordingly, an ion implanter useful for making laminae by this method preferably delivers an implant energy greater than about 100 keV and more preferably encompassing implant energies greater than about 150 keV, 200 keV, 250 keV, or 300 keV, 400 keV, 500 keV, 600 keV, 700 keV or greater. The optimal implant dose is on the order of $10^{16}$ ions/cm$^2$ or more, up to or greater than $10^{17}$ ions/cm$^2$. Such an implant dose may be delivered in an economical processing time by an ion beam conveying a current on the order of greater than 5 mA, 20 mA, 30 mA, 40 mA, 50 mA, 60 mA, 80 mA, 100 mA, 120 mA or 150 mA.

Figure 7:
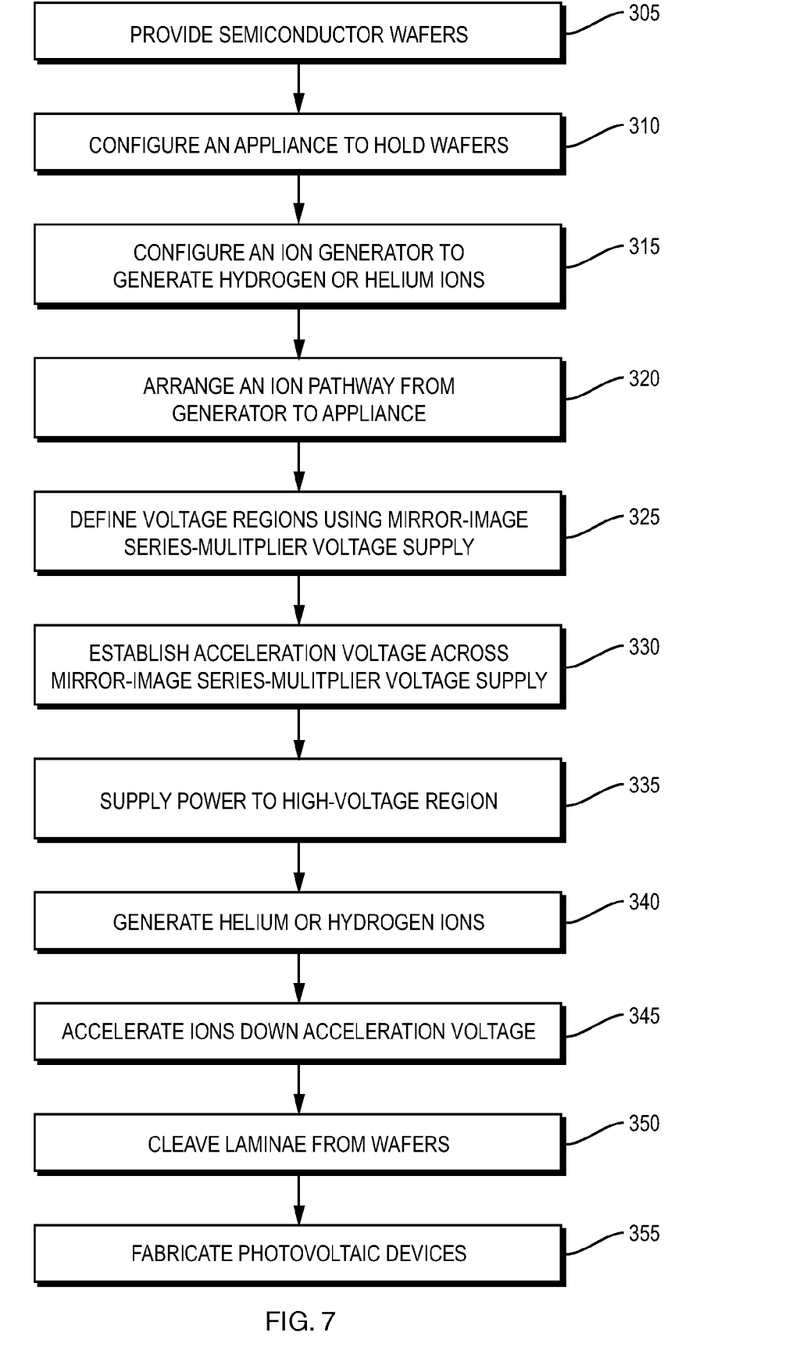
FIG. 7 is a flow diagram demonstrating an illustrative sequence of steps for making a photovoltaic device by ion implantation followed by lamina exfoliation according to the invention.

FIG. 7 demonstrates steps in an exemplary process sequence for fabricating photovoltaic devices from laminae prepared by accelerating ions through a potential difference imposed across the series-transformer isolation circuit. Wafers of, for example, polycrystalline or monocrystalline silicon are provided (step 305). An ion implanter such as the high-energy ion implanter 100 of FIG. 6 is configured to implant hydrogen ions in the wafers at high energies. In particular, the appliance 170 is configured to hold the wafers (step 310); the ion generator 120 of the ion implanter 100 is configured to generate hydrogen ions (step 315); and an ion pathway, for example the acceleration column 150, is arranged from the ion generator 120 to the appliance 170 (step 320).

A mirror-image voltage supply 10, for example having voltage multipliers VM1 and VM2 each comprising a parallel Cockcroft-Walton structure (FIG. 3) of eight stages, is composed and connected to define higher- and lower-voltage parts of the ion implanter 100 (step 325). The voltage apparatus APP1 and APP2 are configured to supply a respective 20 kV AC input voltage to the input terminals IN1 and IN2 of the respective eight-stage voltage multipliers VM1 and VM2. The mirror-image voltage supply 10 is thus configured to generate a DC high voltage of, illustratively, about 320 kV between the common terminals COM1 and COM2, connected to the ground shield 50 and the enclosure 80, respectively. Step 325 may further encompass, e.g., tying the ground shield 50 to the second end 152 of the acceleration column 150; tying the enclosure 80 to the first end 151 of the column 150, and configuring a power source (not shown) to supply the high-voltage region 85.

During implantation, the mirror-image voltage supply 10 is operated to establish an acceleration voltage of about 320 kV along the ion pathway between the ion generator 120 and the appliance 170 (step 330), for example along the acceleration column 150. AC power is provided to the power inputs POWER1 and POWER2 (step 335) of the voltage supply 10.

Hydrogen ions are generated by the ion generator 120 (step 340) and exposed to the acceleration voltage (step 345), for example at the first end 151 of the acceleration column 150. Processes between steps 340 and 345 may include, e.g., extracting the ions from the generator 120 to an extraction energy, illustratively about 80 keV, and selecting extracted ions for implantation. Hydrogen ions are driven by the acceleration voltage in an ion beam to an implant energy of about 400 keV, toward the appliance 170, and into the wafers.

The ion beam irradiates the wafers disposed on the appliance 170 until the time integral of the current of the ion beam illustratively corresponds to a dose of, e.g., $7 \times 10^{16}$ ions/cm$^2$, the implanted hydrogen ions defining a cleave plane in each wafer. The implanted wafers are removed from the ion implanter 100 and treated to effect cleaving of laminae from the wafers at cleave planes (step 350), for example by annealing. The laminae are about 4.0 µm thick. Photovoltaic devices are fabricated from the laminae by further processing (step 355), as described in Sivaram et al. and Petti et al., earlier incorporated by reference.

Although specific features of the invention are included in some embodiments and not in others, it should be noted that individual feature may be combinable with any or all of the other features in accordance with the invention.

It will therefore be seen that the foregoing represents a highly advantageous approach to supplying high voltage, particularly for use in high-energy ion implanters. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An electrical system comprising:
a first voltage apparatus, having a power input and being configured to supply an AC input voltage;
a first voltage multiplier having
an AC input configured to receive the AC input voltage,
a common terminal, and
an output configured to deliver a multiple of the AC input voltage, such that the output is at a higher potential than the common terminal by a first difference;
a second voltage apparatus, having a power input and being configured to supply an AC input voltage;
a second voltage multiplier having
an AC input configured to receive the AC input voltage supplied by the second voltage apparatus,
a common terminal, and
an output configured to deliver a multiple of the AC input voltage supplied by the second voltage apparatus, such that the output of the second voltage multiplier is at a lower potential than the common terminal of the second voltage multiplier by a second difference;
a first transformer having a primary winding, and a secondary winding;
a second transformer having a primary winding, and a secondary winding, the primary winding of the second transformer coupled to the secondary winding of the first transformer to form an inter-transformer coupling; and
an AC source configured to supply power to the primary winding of the first transformer,
wherein the second voltage multiplier is configured to receive power from the secondary winding of the second transformer;
wherein the output of the first voltage multiplier and the output of the second voltage multiplier are electrically connected and wherein the power input of the first voltage apparatus is distinct from the power input of the second voltage apparatus,
the output of the first voltage multiplier is a single terminal,
the output of the second voltage multiplier is a single terminal,
the first voltage multiplier is configured to deliver a DC voltage to the output of the first voltage multiplier, and
the second voltage multiplier is configured to deliver a DC voltage to the output of the second voltage multiplier.

2. The electrical system of claim 1 wherein the inter-transformer coupling is electrically connected to a voltage midpoint between the common terminal of the first voltage multiplier and the common terminal of the second voltage multiplier.

3. An electrical system comprising:
a first voltage apparatus having a power input and being configured to supply an AC input voltage having a first amplitude of at least 10 kV;
a first Cockcroft-Walton multiplier having
an AC input configured to receive the AC input voltage,
a common terminal, and
an output terminal configured to deliver a multiple of the AC input voltage, such that the output terminal is at a DC potential higher than the common terminal by a first difference equal to at least 150 kV;
a second voltage apparatus having a power input and being configured to supply an AC input voltage having a second amplitude equal to the first amplitude; and
a second Cockcroft-Walton multiplier having
an AC input configured to receive the AC input voltage supplied by the second voltage apparatus,
a common terminal, and
an output terminal, electrically connected to the output terminal of the first Cockcroft-Walton multiplier, configured to deliver a multiple of the AC input voltage supplied by the second voltage apparatus, such that the output terminal of the second voltage multiplier is at a DC potential lower by the first difference than the common terminal of the second voltage multiplier,
a first transformer having a core, a primary winding, and a secondary winding;
a second transformer having a core, a primary winding, and a secondary winding electrically connected to the common terminal of the second Cockcroft-Walton multiplier, the primary winding of the second transformer coupled to the secondary winding of the first transformer to form an inter-transformer coupling; and
an AC source configured to supply power to the primary winding of the first transformer,
wherein the electrical system is configured to deliver a DC output current of at least 20 mA and wherein the power input of the first voltage apparatus is distinct from the power input of the second voltage apparatus, and
wherein the second Cockcroft-Walton multiplier is configured to receive power from the secondary winding of the second transformer and the inter-transformer coupling is electrically connected to a voltage midpoint between the common terminal of the first Cockcroft-Walton multiplier and the common terminal of the second Cockcroft-Walton multiplier.

4. An electrical system comprising:
a first voltage apparatus, having a power input and being configured to supply an AC input voltage;
a first voltage multiplier having
an AC input configured to receive the AC input voltage,
a common terminal, and
an output configured to deliver a multiple of the AC input voltage, such that the output is at a higher potential than the common terminal by a first difference;
a second voltage apparatus, having a power input and being configured to supply an AC input voltage;
a second voltage multiplier having
an AC input configured to receive the AC input voltage supplied by the second voltage apparatus,
a common terminal, and
an output configured to deliver a multiple of the AC input voltage supplied by the second voltage apparatus, such that the output of the second voltage multiplier is at a lower potential than the common terminal of the second voltage multiplier by a second difference;

an enclosure, wherein the first voltage multiplier is electrically connected to the enclosure through the common terminal of the first voltage multiplier and the first voltage apparatus is disposed in the enclosure, or the second voltage multiplier is electrically connected to the enclosure through the common terminal of the second voltage multiplier and the second voltage multiplier is disposed in the enclosure;

an appliance configured to hold a semiconductor wafer;

an acceleration column having proximal and distal ends with respect to the appliance, the distal end being electrically connected to the common terminal of the one of the first and second voltage multipliers that is electrically connected to the enclosure, and the proximal end being electrically connected to the common terminal of the other of the first and second voltage multipliers; and an ion source, disposed in the enclosure and configured to generate ions, wherein the output of the first voltage multiplier and the output of the second voltage multiplier are electrically connected and wherein the power input of the first voltage apparatus is distinct from the power input of the second voltage apparatus;

wherein the output of the first voltage multiplier is a single terminal, the output of the second voltage multiplier is a single terminal, the first voltage multiplier is configured to deliver a DC voltage to the output of the first voltage multiplier, the second voltage multiplier is configured to deliver a DC voltage to the output of the second voltage multiplier;

wherein the ion source is configured to generate ions of hydrogen or helium;

wherein the common terminal of the second voltage multiplier is electrically connected to the enclosure; and wherein the acceleration column is configured to conduct the hydrogen or helium ions generated by the ion source to the appliance in an ion beam with augmentation of respective ion energies by an acceleration voltage greater than or equal to the sum of the first and second differences, so that the hydrogen or helium ions are implanted in the semiconductor wafer at a depth defining a cleave plane such that a lamina cleaved from the wafer at the cleave plane is at least 1 µm thick.

5. The electrical system of claim 4 wherein the sum of the first and second differences is greater than 250 kV.

6. The electrical system of claim 4 wherein the hydrogen or helium ions in the ion beam constitute a current of at least 20 mA.

7. The electrical system of claim 4 wherein the lamina cleaved has a thickness of at least 3 µm.

8. An electrical system comprising:

a first voltage apparatus having a power input and being configured to supply an AC input voltage having a first amplitude of at least 10 kV;

a first Cockcroft-Walton multiplier having
an AC input configured to receive the AC input voltage,
a common terminal, and
an output terminal configured to deliver a multiple of the AC input voltage, such that the output terminal is at a DC potential higher than the common terminal by a first difference equal to at least 150 kV;

a second voltage apparatus having a power input and being configured to supply an AC input voltage having a second amplitude equal to the first amplitude; and a second Cockcroft-Walton multiplier having
an AC input configured to receive the AC input voltage supplied by the second voltage apparatus,
a common terminal, and
an output terminal, electrically connected to the output terminal of the first Cockcroft-Walton multiplier, configured to deliver a multiple of the AC input voltage supplied by the second voltage apparatus, such that the output terminal of the second voltage multiplier is at a DC potential lower by the first difference than the common terminal of the second voltage multiplier; and an enclosure, wherein the second voltage apparatus is disposed in the enclosure and the common terminal of the second Cockcroft-Walton multiplier is electrically connected to the enclosure, wherein the electrical system is configured to deliver a DC output current of at least 20 mA and wherein the power input of the first voltage apparatus is distinct from the power input of the second voltage apparatus.

* * * * *